Patented Sept. 3, 1935

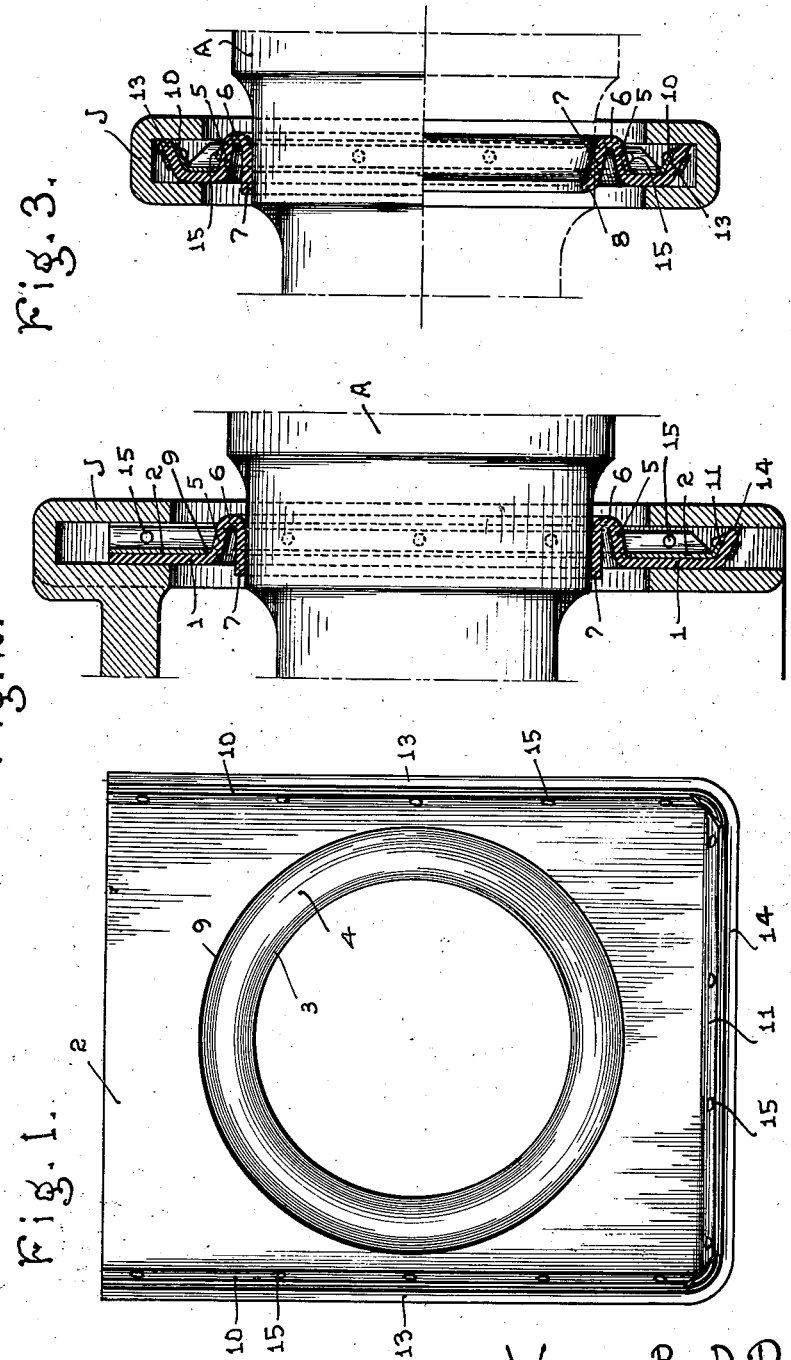

2,012,974

UNITED STATES PATENT OFFICE 2,012,974

OIL SEAL

William B. D. Penniman, Baltimore, Md.

Application February 5, 1930, Serial No. 425,993

3 Claims. (Cl. 286—6)

This invention relates to oil seals, and more particularly oil seals of the character used in connection with journal boxes.

Among the objects of the present invention is the production of oil seals which also serve as dust guards, particularly for axles and journal boxes such as are utilized in connection with railway rolling stock, including steam and electric railways, which oil seals may be utilized in conjunction with present equipment without substantial modification of the journal boxes now utilized, to secure positive sealing action in such journal boxes. Such objects include the production of oil seals of the character indicated above which may be inserted into the presently utilized journal boxes without requiring attachment by way of bolts, etc. to the journal box itself, the seal being held in place by frictional contact with the walls of the journal box. Other objects include the production of such oil seals capable of absorbing the relative movements between axle and journal box without substantial relative movement between the oil seal itself and the journal box.

Other objects and advantages will appear from the more detailed description set forth below, it being understood however that this more detailed description is given by way of illustration only and not by way of limitation, since variations in the disclosure may be made by those skilled in the art without departing from the scope and spirit of the present invention.

In connection with that more detailed description there is shown in the drawing, in Figure 1 a front elevational view of an oil seal made in accordance with the present invention; in Figure 2 a vertical cross section through the oil seal of Figure 1 shown in position in a journal box, the journal box and axle being fragmentarily illustrated; and in Figure 3 a horizontal section through the oil seal of Figure 1 shown in position in a journal box, the journal box and axle being fragmentarily indicated, the upper half of Figure 3 indicating the final position of the oil seal with respect to the axle after the latter has been inserted through the oil seal, while the lower half of Figure 3 indicates the initial position of the oil seal as the axle is about to be inserted therethrough.

As indicated in the drawing, the oil seal desirably comprises a planar leather member 1 and a planar metallic member 2 for supporting or reenforcing the flexible member 1. The flexible member 1 is provided centrally with an opening 3 for receiving the axle. Adjacent the axle opening 3, the flexible member 1 is desirably supplied with a flexed collar 4 comprising a flaring member 5, a neck 6 and a sleeve member 7, the flaring member 5, neck 6 and sleeve 7 desirably being integral with the material of the flexible member 1. The sleeve 7 is adapted to rest against the surface of the axle, and the flaring member 5 and neck 6 serve to increase the flexibility of the oil seal at the point where the flexed collar seats upon the axle. When the oil seal is made with the flaring member 5, neck 6 and sleeve 7 integral with the flexible member 1, the flexed collar portion of the oil seal may desirably be molded from a substantially flat piece of material from which the oil seal is made. Initially, the sleeve portion 7 is desirably supplied with an inwardly flared peripheral edge 8 somewhat smaller than the diameter of the axle at the point where the sleeve contacts therewith, so that upon insertion of the axle A, a greater portion of the surface area of the sleeve 7 will contact with the surface of the axle.

The face of the flexible member 1 opposite to that which is in contact with the metallic member 2 offers a broad surface of contact with one of the walls of the journal box J. The metallic member 2 attached to the flexible member 1 approximates the size of the flexible member 1, but is provided with a central opening 9 of sufficient size to accommodate the flexed collar of the oil seal. The side and bottom edges of the metallic member 2 are desirably angularly displaced with respect to the plane of the metallic member 2 as shown at 10, 10 and 11 to provide a seat for flexible material adapted to seat against the walls of the journal box J and prevent contact between the angularly displaced peripheral portions of the metallic member 2 and the walls of the journal box. For this purpose, flexible material 13, 13 and 14 carried on the angularly displaced metallic portions 10, 10 and 11 are desirably directed against the walls of the journal box J opposite to the wall of the journal box J against which the inner face of the flexible member 1 seats. Desirably the flexible material portions 13, 13 and 14 are integral with the flexible member 1, so that the peripheral portions of the flexible member 1 may be angularly displaced with respect to the plane of the flexible member 1 to form the angularly disposed portions 13, 13 and 14. When so constructed, rivets 15 passing through the angularly disposed metallic portions and flexible material portions serve to secure the flexible member 1 to the metallic member 2. This structure represents the preferred embodiment of the present invention, but obviously the metallic and flexible member may be otherwise secured together and rivets may pass through the planar portions of the flexible and metallic members 1 and 2, if the flexible material strips 13, 13 and 14 are not integral with the body portion of the flexible member 1.

As illustrated in the drawing, the relation of parts is such that the oil seal does not extend substantially beyond the walls of the slot in the journal box, which slot receives such oil seal.

As indicated above, the flexible member 1 is so made that it serves to take up within itself the relative movement between the axle and journal box. For this use, the material out of which the flexible member 1 is made should be flexible, elastic, resilient, pliable, supple, or otherwise properly yieldable. A flexible or elastic member made from leather is an excellent article for such purposes. When leather is utilized, the following procedure may be used to produce a preferred article. A piece of leather of suitable size and shape is soaked in water until it can be stretched in any direction. It is then subjected to hydraulic or other pressure to form it into the desired shape. Desirably it is dried while retained in the mold so that the impressed shape is maintained. Subsequently it may be soaked in an oil, such as sperm oil. Such procedure results in a highly desirable article due to its flexibility and toughness, but of course other methods of forming and preparing the material and other types of material may also be utilized.

The oil seal is readily assembled by associating the flexible member 1 and metallic reenforcing or supporting plate 2 together and securing the parts by means of the rivets 15.

In placing the oil seal in position, the seal may be driven into the guard slot of the journal box before the axle, etc. has been associated with the journal box. The oil seal is of such size that it is wedged securely into position within the guard slot with the outer face of the flexible member 1 seated on a wall of the journal box slot, and the flexible strips 13, 13 and 14 being seated against a wall of the journal box opposite to that against which the face of the flexible member 1 is seated. The angularly disposed peripheral portion of the metal plate to which the angularly disposed flexible strips are attached, also serves to increase the wedging effect, whereby the seal is rigidly secured in position. Consequently the oil seal, which also serves as a dust guard, is securely maintained in position against relative movement with respect to the journal box, so that movements between the axle and journal box are taken up within the flexible member 1. The flexed collar on the flexible member 1 increases the capacity of the oil seal for absorbing the relative movements between the axle and journal box.

After the oil seal has been placed in the guard slot of the journal box and prior to the flexed collar embracing the axle, the collar takes a position similar to that illustrated in the lower portion of Figure 3 of the drawing. When the axle is placed in position, the flexed collar closely embraces the axle, and this action is enhanced by the flaring portion 8 of the sleeve 7. The ultimate position reached is that illustrated in the upper half of Figure 3 of the drawing and also in Figure 2 thereof.

Due to the flexibility of the leather and also its toughness, the seal is very satisfactory and exhibits a relatively long life. The insertion of the axle through the opening in the flexible member forces the latter to embrace the axle snugly, and thus provides a substantially tight joint that is oil, water and dust tight.

An oil seal made in accordance with the present invention, therefore, may be applied to existing equipment on railway cars and the like without requiring any modification of the existing structure of such cars. And although the oil seal may be readily placed in position or removed when desired, an effective seal is produced.

Having thus set forth my invention, I claim:

1. An oil seal for axles and journal boxes comprising a planar metallic member having a peripheral portion angularly displaced with respect to the plane of the metallic member, a leather member adjacent said metallic member, one face of the leather member being adapted to engage a wall of the journal box, a peripheral portion of the leather member being angularly displaced to lie against and complement the angularly displaced portion of the metallic member, the angularly disposed peripheral portion of the leather member extending beyond the edge of the metallic member for contact with a wall of the journal box, axle openings in the metallic and leather members, and an axle receiving sleeve on the leather member at the axle opening, said sleeve extending through the axle opening of the metallic member.

2. In a journal box having a guard slot therein, means for preventing escape of lubricant comprising an oil seal positioned within said slot, said seal comprising a flexible annular plate having a free axial flange adapted to embrace an axle closely, the plate being of such configuration that when forced into said slot it will have a wedging engagement with the walls thereof, to prevent substantial movement of the seal with respect to the box under operating conditions, the axial flange being so constructed and arranged as to remain in close engagement with said axle irrespective of movements incident to operation.

3. In a journal box having a guard slot therein, means for preventing escape of lubricant comprising an oil seal positioned within said slot, said seal comprising a flexible annular plate having a free axial flange adapted to embrace an axle closely, the plate being of such configuration that when forced into said slot it will have a wedging engagement with the walls thereof, to prevent substantial movement of the seal with respect to the box under operating conditions, the axial flange being so constructed and arranged as to remain in close engagement with said axle irrespective of movements incident to operation, and a reenforcing metallic plate carried by said flexible annular plate, said reenforcing plate being maintained on said flexible annular plate out of contact with the walls of said slot.

WILLIAM B. D. PENNIMAN